Aug. 22, 1967    F. M. IANNELLI    3,337,197
CARBONATING APPARATUS
Filed Aug. 17, 1966

INVENTOR.
FRANK M. IANNELLI
BY
Harry B. Keck,
ATTORNEY

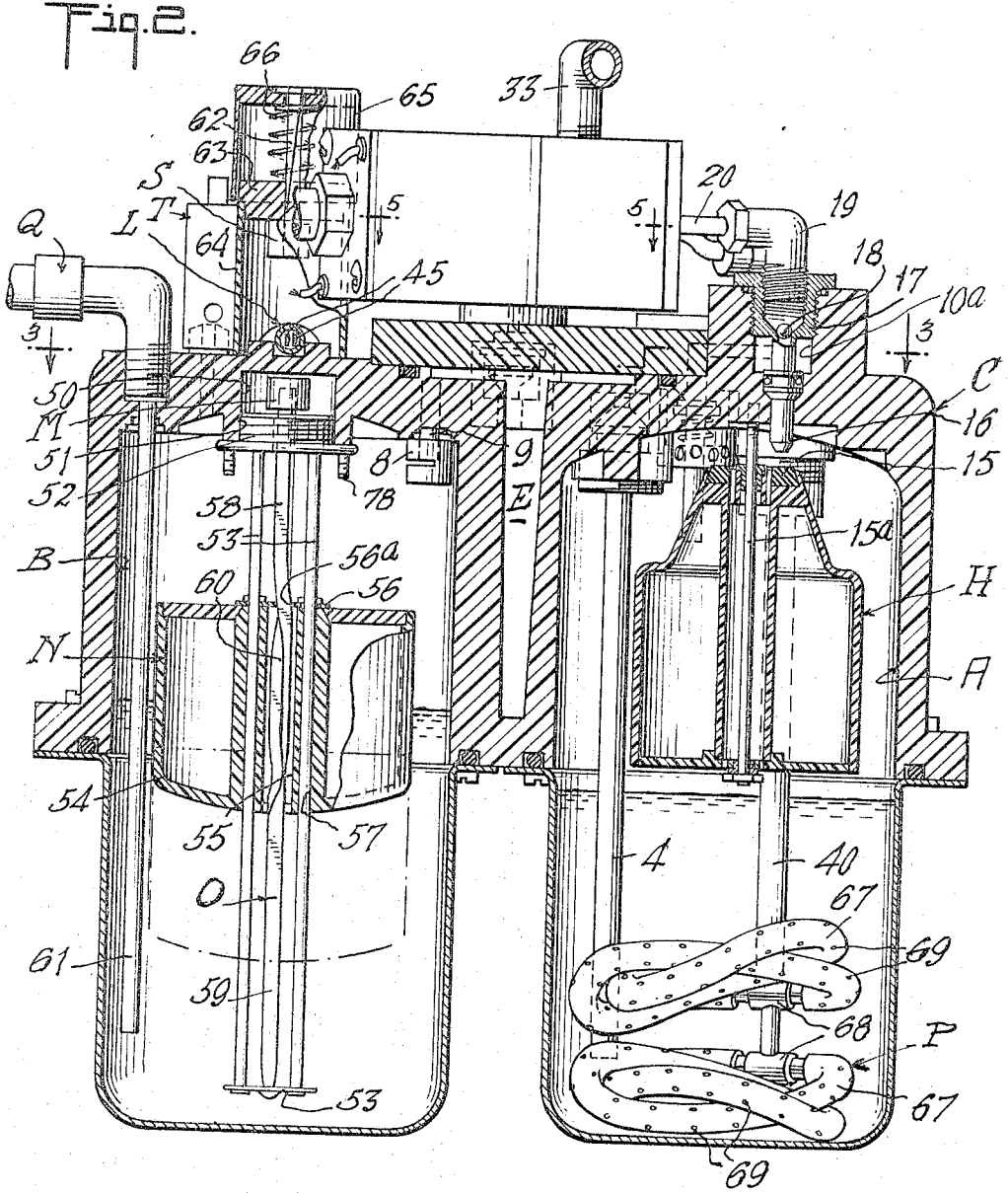

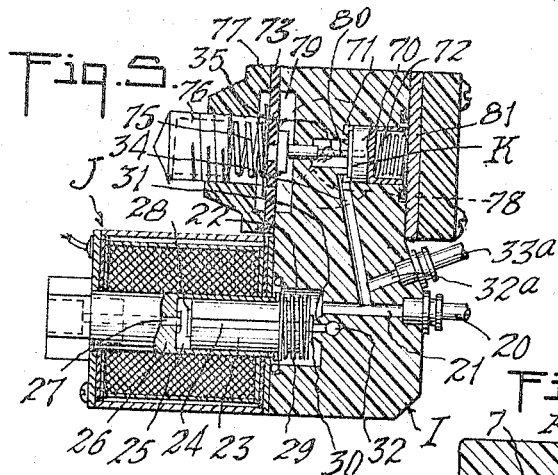
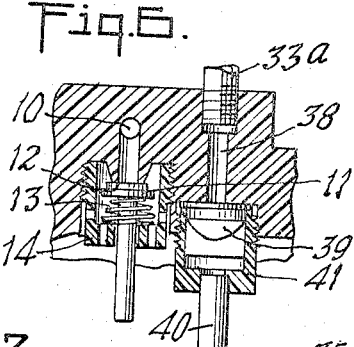
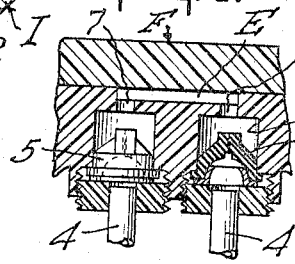
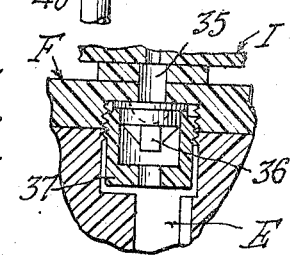
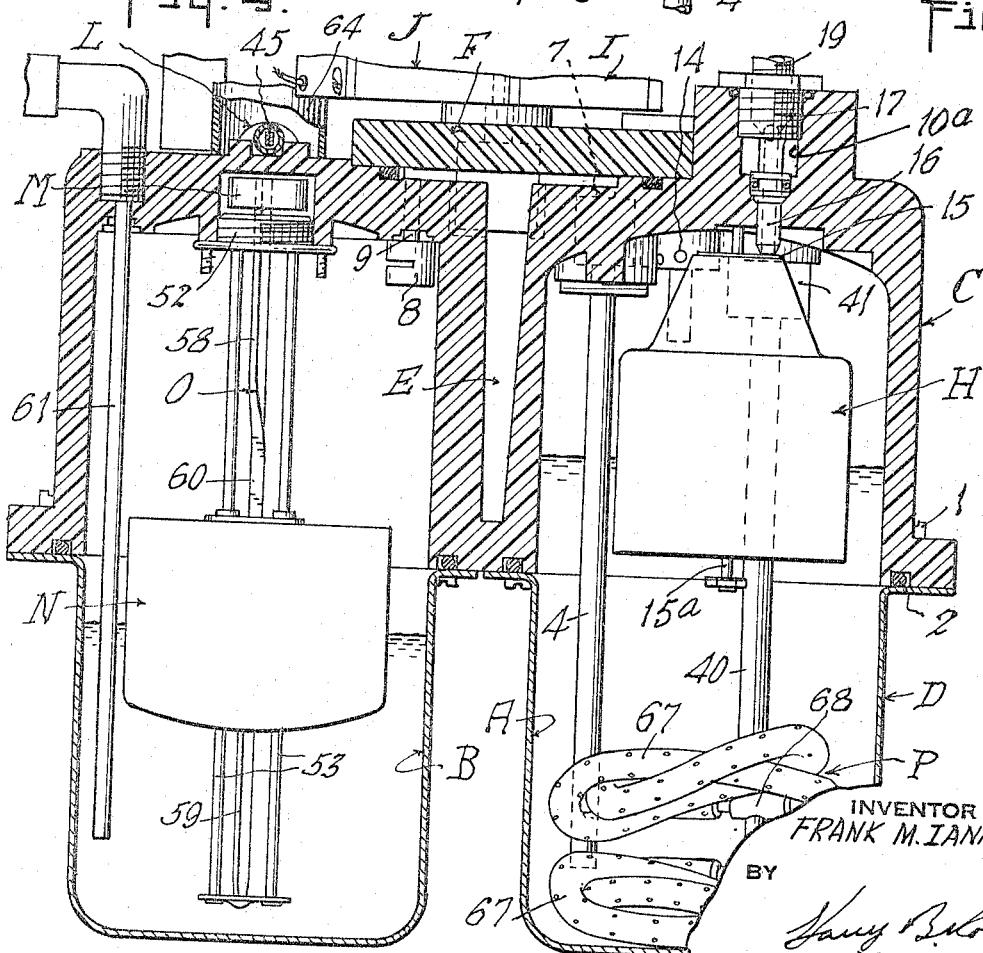

United States Patent Office 3,337,197
Patented Aug. 22, 1967

3,337,197
CARBONATING APPARATUS
Frank M. Iannelli, 5 Penwood Road,
Livingston, N.J. 07039
Filed Aug. 17, 1966, Ser. No. 573,071
12 Claims. (Cl. 261—160)

This invention relates to carbonating apparatus of the type shown in United States Patent No. 2,782,016 dated Feb. 19, 1957 wherein water or other liquid flows from its source under its normal pressure into a combined reservoir and pre-carbonating chamber to be mixed with the carbonating gas and is forced from said chamber by the gas itself into a combined mixing and dispensing chamber, thereby avoiding the necessity for a motor driven liquid pump. The supply of carbonating gas to said chambers is controlled by an electromagnetic valve, the circuit through the solenoid of which is controlled by a circuit making and breaking device in accordance with variations in the liquid level.

In accordance with the present invention there is provided such apparatus which includes a circuit making and breaking device, e.g. a switch mechanism, for controlling the electromagnetic valve in such a manner that the supply of carbonating gas is automatically shut off if the supply of water or other liquid to be carbonated is interrupted. The invention also provides apparatus of this character which embodies means including novel and improved pipe coils for pre-carbonating the liquid in the reservoir and pre-carbonating chamber.

During the operation of apparatus of this character, there is a tendency toward frosting or freezing of the air vent through which carbonating gas escapes from the reservoir and pre-carbonating chamber during the influx of water, and it is another object of the invention to provide in such apparatus a simple and reliable defroster for preventing accumulation of frost or ice on the vent opening.

Also when the gas supply fails, in the operation of carbonating apparatus of the general character described, there is a tendency for the water under the normal supply pressure to seep into the apparatus in such a way that the liquid rises to an abnormally high level which prevents operation in the normal manner of the circuit making and breaking device that controls the electromagnetic valve, so that the supply of gas is cut off and operation of the apparatus cannot be re-started. Therefore, it is a further obpject of the invention to provide manually operated means for actuating the circuit making and breaking device to re-start the supply of gas to the apparatus and thereby force the water back to its normal operating level for re-cycling of the carbonating operation.

It is also an object of the invention to provide a construction and combination of a housing and the means hereinbefore described which shall be simple, relatively inexpensive and reliable in operation.

Other objects, advantages and results of the invention will be brought out by the following description in conjunction with the accompanying drawings in which FIGURE 1 is a top plan view of the apparatus with portions broken away for clearness of illustration;

FIGURE 2 is a central vertical view approximately on the plane of the line 2—2 of FIGURE 1, showing the parts in their positions during the flow of water from the city supply into the reservoir and pre-carbonating chamber;

FIGURE 5 is an enlarged fragmentary horizontal sectional view on the plane of the line 5—5 of FIGURE 2;

Figure 1:
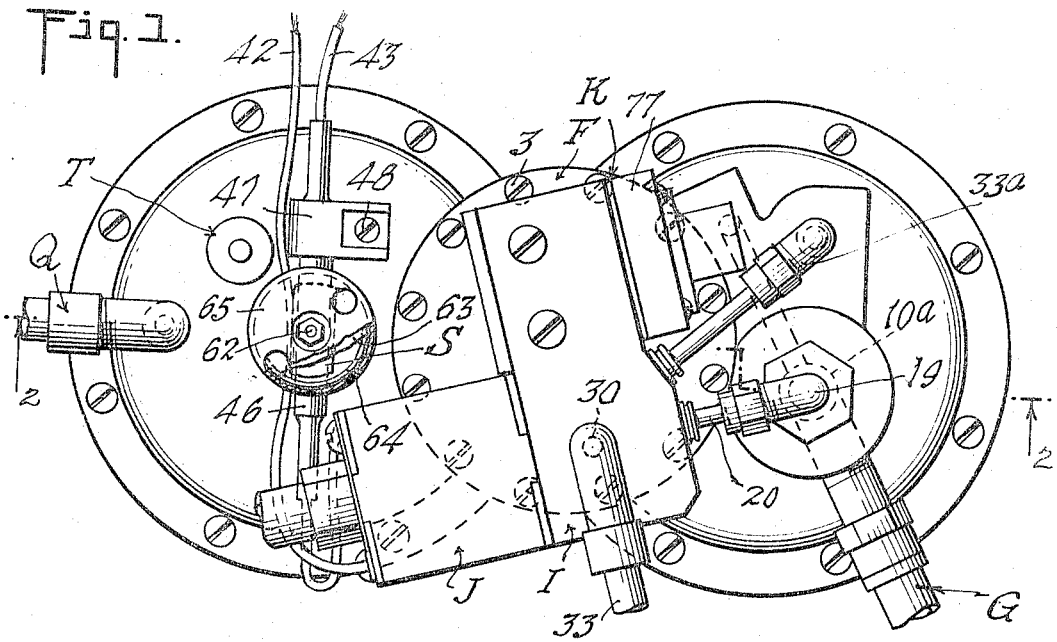
Figure 3:
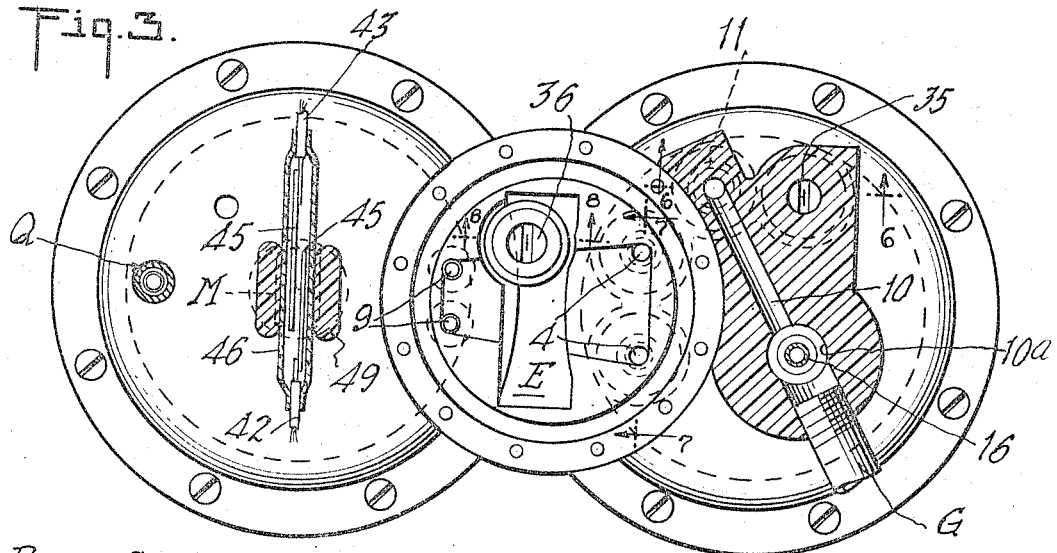
FIGURE 3 is a horizontal sectional view approximately on the plane of the line 3—3 of FIGURE 2.

FIGURES 6, 7 and 8 are fragmentary vertical sectional views on the planes of the lines 6—6, 7—7 and 8—8, respectively, of FIGURE 3, also showing parts that are omitted in FIGURE 3; and FIGURE 9 is a view similar to FIGURE 2 with portions omitted and showing the positions of the several parts during the forcing of the pre-carbonating liquid from the reservoir and pre-carbonating chamber into the mixing and dispensing chamber.

Specifically describing the invention, the reference characters A and B designate, respectively, the combination reservoir and pre-carbonating chamber and the combination mixing and dispensing chamber. These chambers are shown as generally cylindrical in shape and are preferably formed of a housing section C molded of a synthetic resin having a cavity for each chamber and to which are secured in liquid-tight relation thereto by screws 1 and packing rings 2, in cup like sections D, one for each chamber. This construction provides an electrically insulated main section C for easy and quick attaching and detaching of the sections D for access to the parts in the chambers and for cleaning the chambers. The section C is also formed with a carbonating recess E between said chambers, the upper end of which is closed by a cap plate F secured by screws 3.

The carbonating recess E communicates at one side with the chamber A by tubes 4 through normally closed slit rubber check valves 5, best shown in FIGURE 7, that open under the pressure of the liquid from the chamber A. The valves 5 are mounted in recesses 6 in the top wall of the housing section C, and ports 7 lead from said recesses to the carbonating recess E. At its other side the carbonating recess E communicates with the chamber B through two slotted spray heads 8 each of which is connected by a tube 9 to the carbonating recess E.

Water or liquid to be carbonated from a suitable source and under suitable pressure, for example water from a city water supply at twenty p.s.i. enters the apparatus from a pipe G and through a duct 10 in the top wall of the housing to a spring closed valve 11 (FIG. 6) that is normally pressed against its seat 12 by a spring 13 interposed between the valve and one end of a perforated cup shaped casing 14 that is screwed into the top wall of the housing. The valve 11 opens under pressure of the incoming water to permit the water to flow into the chamber A. While the gas therein is vented therefrom, such flow of the water continues until it is stopped by a float H vertically reciprocable in the chamber on a rod 15a, which has a valve seat 15 engaging the end of a vent tube 16 which is carried by a bushing 17 screwed into the outer side of the top wall of the housing and having therein a gravity-closed ball check valve 18 that opens under pressure of the air forced out of the chamber A by the incoming water. The bushing is connected by an elbow 19 and tube 20 to a vent passage 21 in a block I secured to the cap plate F. This passage leads to a valve chamber 22 into which projects the core 23 of the electromagnetic valve unit J, which has longitudinal external slots 24 that open into a space 25 between the core and its casing 26 through which extends a vent hole 27 that opens to the atmosphere. The hole 27 is opened and closed by a valve disk 28 on the end of the core which is normally held in a position to open the vent hole by a compression spring 29 which normally biases the core so as to hold a second valve disk 30 on the other end of the core against a valve seat 31. The valve 30, 31 controls the flow of high pressure carbonating gas into the chamber 22 from an inlet duct 32 which is connected by pipe 33 to a supply of carbonating gas under high pressure, for example 140 p.s.i. When the solenoid of the electromagnetic valve unit J is energized, the core 23 is actuated so as to close the air vent opening 27 and at the same time open the valve 30, 31 to admit high pressure gas into the apparatus.

The high pressure gas flows through the passage 21 into a duct 32a which is connected by tube 33a to the gas inlet and pre-carbonating head of the chamber A, and the high pressure gas also flows from the passage 21 through another passage 34 to a pressure regulating valve assembly K by which the pressure is reduced, for example to 70 p.s.i. and flows through a duct 35 and a slitted rubber check valve 36 (FIG. 8) into the carbonating recess E. The high pressure gas tube 33 is connected to a duct 38 in the top of the wall of the housing C (FIG. 6) and through a slitted rubber check valve 39 to the high pressure gas inlet pipe 40 of the chamber A to which is connected the carbonating head P. The valve 39 is arranged in a cup shaped casing 41 screwed into the housing C and has the pipe 40 connected thereto. The valve 36 is shown (FIG. 8) as mounted in a cup shaped casing 37 that is screwed into the cap plate F, and the valve opens under the incoming gas pressure and automatically closes when the pressure is relieved.

The circuit through the solenoid of the electromagnetic valve unit J is controlled by a normally open switch L connected in series circuit with the solenoid and a source of electricity and actuated into closed position by a permanent bar magnet M which is in turn rotated by coaction of a float N in the chamber B and a helically twisted rod O to one end of which the magnet M is connected intermediate the ends of the magnet. A magnetically operated switch of this character is shown and described in the co-pending application of Frank M. Iannelli, Ser. No. 397,450, now Patent No. 3.283,095.

Wires 42 and 43 from the solenoid extend to the external fixed ends of the respective resilient magnetic leaf switch contacts 44 and 45 of the switch L. The free ends of said leaf contacts are normally separated as shown in FIGS. 3 and 2 but may be magnetically brought together or closed, or allowed to separate or to open, upon turning of the permanent bar magnet M on the axis of the rod O. The magnet is exposed closely beneath the leaf contacts but separate therefrom by the top wall of the housing section C. The leaf contacts are shown as mounted in a plastic tube or housing 46 in the opposite ends of which the leaf contacts are sealed as shown in FIGURE 3. The tube 46 is held in place in any suitable manner, for example by clips 47 held in place on the top wall of the housing by screws 48. Spaced apart upstanding lugs 49 on the housing provide a socket between them for the plastic tube 46.

The housing top wall has a downwardly opening recess 50 the lower interior portion of which is threaded as indicated at 51 and adjustably receives a screw-threaded mounting fitting 52 for rods 53 that slidably support the float N. The lower ends of the rods are rigidly fixedly connected together for example, by a plate 53. Both the housing section C and the fitting 52, like the tube 46, are formed of non-magnetic electrical insulating material. For mounting the float on the rods, the float is shown as formed with a buoyant hollow body 54 and has a central opening 55. At the upper end of the body the central opening 55 is bridged by a plate 56 rigidly secured to the body and having a rectangular aperture 56a through which the rod O relatively slidably extends. The body also has openings 57 parallel to the opening 55, through each of which extends one of the rods 53. To rotate the bar magnet M, the actuating rod O is preferably square in cross-section and is twisted into helical form along portions of its length to provide the respective upper and lower helical portions 58 and 59 and a portion 60 therebetween, the portions 58 and 59 being twisted in opposite directions from the intermediate portion 60. The parts are so arranged and mounted that when the float body 54 is at its upper position the movement of the apertured plate 56 by the float relative to the rod O, will move the magnet M so that the leaf contacts 45 will be separated to break the circuit through the solenoid J. Movement of the float downwardly along the intermediate portion 60 of the rod will rotate the magnet to effect movement of the contacts together to close said circuit. Further descent of the float will then, through the lower twisted portion 59 of the rod O, rotate the magnet to its original position so that the circuit is again opened through the solenoid. When the circuit through the solenoid is open as shown in FIGURE 2 the supply of carbonating gas is cut off, while when the circuit is closed as shown in FIGURE 9, carbonating gas is admitted into the apparatus.

Figure 4:
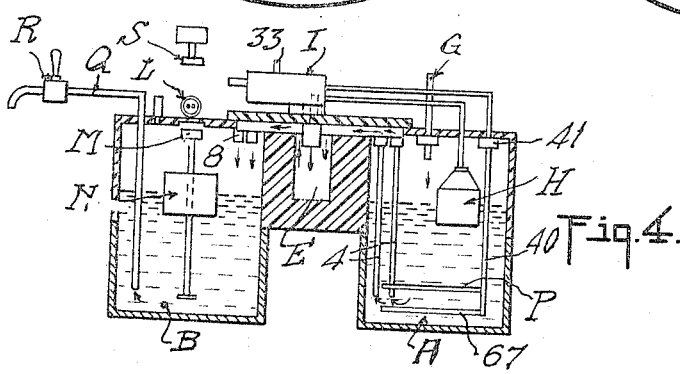
FIGURE 4 is a schematic sectional and elevational view of the apparatus on a reduced scale.

The carbonated liquid to be dispensed from the chamber B leaves the chamber through an outlet tube 61 that depends into the chamber from the top wall of the housing and is connected at its upper end to a discharge pipe Q which may have a suitable valve or faucet R as shown in FIGURE 4.

In operation of the apparatus so far described, assuming the chambers A and B are empty and the floats H and N are at their lowest positions, the electrical and gas connections are first made and then the water or other liquid to be carbonated is allowed to flow under, for example the city pressure, into the reservoir and pre-carbonating chamber A through the valve 11, 12. During this operation the air in the chamber is permitted to escape through the vent tube 16, check valve 18, passage 21, vent grooves 24 in the solenoid core and the vent hole 27 (FIG. 5). When the liquid has reached a predetermined level, the float H is elevated so that valve seat 15 on the float engages the end of the tube 16 and closes the vent, after which the liquid flows through tubes 4 into the carbonating recess and thence through tubes 9 and spray heads 8 into the mixing and dispensing chamber B. During this operation the carbonating gas supply is cut off at valve 30, 31. When the liquid level in chamber B rises and the float N moves along the portion 60 of the rod O, the float actuates the magnet M to close the switch L and energize the solenoid which opens the valve 30, 31 to permit influx of carbonating gas at high pressure, about 135 p.s.i., to the chamber A and at the same time admit carbonating gas through the pressure reducing valve K to the carbonating chamber E at a pressure of around 70 p.s.i. The high pressure in chamber A forces additional liquid into chamber B causing float H to descend and float N to rise and actuate the switch into "off" position and thereby cut off the gas supply. The pressure of the gas in chamber A is such as to prevent influx of liquid from the supply at a pressure of, for example 20 to 40 lbs., but when the supply of gas is shut off by the solenoid valve 30, 31, the vent of the chamber A is opened through the vent passages 24, 27 (FIG. 5), and then the pressure drops in chamber A and liquid from the source will enter the chamber until the level rises high enough to again close the float valve 15, 16. Then, both chambers have the normal or predetermined quantities of liquid therein to begin normal carbonating operation, and when the completely carbonated liquid is drawn from the chamber B through discharge pipe Q, float N will descend into the position shown in FIGURE 9 so as to close the switch L and again open the solenoid valve so as to supply carbonating gas to the chambers, it being understood that the liquid flows from the mixing and dispensing chamber B through the discharge pipe under the gas pressure in the chamber.

It will be observed that should the supply of water fail for any reason, the float N will descend to its lowermost position so as to open the switch L and cut off the supply of gas, thereby preventing waste of gas and undesirable flow of gas from the discharge valve R.

In case the supply of gas should fail and water should continue to flow into the apparatus so as to raise the float N to its uppermost position and thereby open the switch L so as to prevent normal automatic operation when the gas supply is replenished, the invention contemplates means for momentarily manually closing the switch to activate the solenoid valve and permit carbonating gas under its normal pressure to enter the apparatus in order to restore the apparatus to operating condition. This means is shown as a manually operated magnetic switch comprising a permanent magnet S, like the magnet M, mounted on a helically twisted rod 62 slidable in a complementary opening in a disk 63 that is mounted on a cylindrical support 64 on the upper side of the top wall of the housing. An inverted cup shaped finger piece 65 is relatively rotatably connected to the end of the rod 63 opposite the magnet, with a spring 66 interposed between the disk 63 and the end of the finger piece 65 to normally hold the magnet in distantly spaced relation to the switch contacts 45. Downward pressure on the finger piece will move the magnet toward the contacts and at the same time cause rotation of the magnet so as to move the contacts into engagement with each other and thereby close the circuit through solenoid with the resultant opening of the gas supply valve 30, 31 to permit flow of gas to the chambers A and B. Upon release of the finger piece the spring will return the magnet to its normal position so as not to interfere with the normal operation of the apparatus.

To avoid the possibility of excessive pressure accumulating in the chamber B, a known type of spring closed relief valve T may be utilized having its inlet connected to the chamber and its outlet to the atmosphere.

Another feature of the invention is the carbonating head P which is shown as comprising two irregularly coiled or looped tubes 67 each having its opposite ends connected by a T-fitting 68 to the high pressure gas supply pipe 40, the coiled pipes having a large number of minute apertures 69 through which jets of carbonating gas are projected into the liquid in the chamber A.

With this construction, the liquid in the chamber A is effectively pre-carbonated, and this pre-carbonated liquid is further carbonated in the recess E by the low pressure gas entering that recess through the passage 35 and the check valve 36. The gas entering the chamber E agitates a relatively small amount of the liquid at any given time so that the gas is effectively absorbed by the liquid, and the liquid is forced from the chamber E through the spray heads 8 in the form of fan-shaped jets, into the gas above the liquid level in the chamber B so that the gas and liquid are thoroughly mixed into a condition suitable for dispensing.

It is another feature of the invention to provide means for defrosting or preventing accumulations of frost or ice in the vent for the chamber A. For this purpose, relatively warm incoming water from the supply is caused to contact the vent tube 16 as the water flows into the chamber A, and this is effected by providing a water circulating chamber 10a in the water inlet passage 10, through which passes a portion of the vent pipe between the end of the vent tube 16 and the check valve 18. The warm water will sufficiently heat the vent tube to prevent accumulation of frost or ice in the vent opening in the tube.

While any suitable pressure reducing or regulating valve may be utilized for reducing the pressure of the high pressure gas from, for example 135 p.s.i. to 70 p.s.i., the invention provides a valve which comprises a cup shaped valve element 70 slidably mounted in a valve chamber 71 at the high pressure gas side of a valve seat at the other side of which is the low pressure gas passage 35. The high pressure gas passage 34 opens directly into said chamber, a restricted duct 78 leads from low pressure passage 35 to the diaphragm chamber 79 at one side of a flexible diaphragm 73. The valve element is normally pressed against its seat by a spring 72 interposed between the valve element and an abutment plate 81. The flexible diaphragm 73 is clamped between a cap plate 77 and the block I and is abutted at one side by one end of a regulating spring 75 the other end of which engages a regulating cap 76 screwed into cap plate 77. The opposite side of the diaphragm engages one end of a pin 80 slidable in the block with its other end abutting the valve element. The valve 70, 71 controls the flow of gas from the passage 34 to the passage 35.

It is desirable that the magnet M be adjustable toward and away from the switch contacts 45 and this is effected by the rotation of the mounting 52. Preferably set screws 78 or other suitable means are provided for locking the member 52 in adjusted position, the screws being threaded into the mounting member and attached to abut the underside of the housing top wall.

What is claimed is:

1. A carbonating apparatus comprising a housing having a reservoir-carbonating chamber with an inlet duct having an inwardly opening check valve for liquid under pressure from a supply of liquid to be carbonated, means including control valves and check valves for admitting gas under pressure into said reservoir-carbonating chamber adjacent the bottom thereof and for venting gas from said chamber to the atmosphere, alternately, a closed mixing-dispensing chamber, means establishing communication between said reservoir-carbonating chamber and said mixing-dispensing chamber including an outlet pipe in the reservoir-carbonating chamber communicating with an inlet passage to said mixing-dispensing chamber adjacent the top thereof above the liquid level therein and a check valve between said outlet pipe and said inlet passage, a gas inlet pipe for said mixing-dispensing chamber communicating with said inlet passage, means providing for supply of carbonating gas to said reservoir-carbonating chamber through the first-named means at a pressure substantially greater than the pressure of the liquid supply to force the liquid in said reservoir-carbonating chamber into said mixing-dispensing chamber, means providing for supply of carbonating gas through the first-named means to said gas inlet pipe of the mixing dispensing chamber at a pressure substantially less than the gas pressure supplied to said reservoir-carbonating chamber, and a discharge pipe for said mixing-dispensing chamber with its entrance end adjacent the bottom of said chamber.

2. A carbonating apparatus as defined in claim 1 wherein said means providing a supply of gas to said inlet passage of the mixing-dispensing chamber includes a carbonating recess in said housing which communicates with both said outlet pipe of the reservoir-carbonating chamber and said inlet passage of said mixing-dispensing chamber and with which carbonating recess communicates said gas inlet pipe for said mixing-dispensing chamber.

3. A carbonating apparatus as defined in claim 1 with the addition of means for causing actuation of said control valves simultaneously to permit flow of carbonating gas into said reservoir-carbonating chamber when the carbonated liquid in said mixing-dispensing chamber moves from a predetermined high level to a predetermined low level and thereby force liquid from the reservoir-carbonating chamber into said mixing-dispensing chamber and to cut off carbonating gas from said reservoir-carbonating chamber and simultaneously vent gas therefrom when the carbonated liquid in said mixing-dispensing chamber returns to said predetermined high level and thereby permit liquid to be carbonated to enter said reservoir-carbonating chamber.

4. A carbonating apparatus as defined in claim 3, wherein the last-named means is constructed to cut off the supply of carbonating gas when the liquid in the mixing-dispensing chamber drops below said predetermined low level upon failure of the supply of liquid.

5. A carbonating apparatus as defined in claim 3 wherein the last-named means includes a solenoid for actuating said valves, a switch for controlling energization and deenergization of said solenoid upon closing and opening of the switch, and means including a float responsive to the liquid level in said mixing-dispensing chamber for controlling opening and closing of said switch.

6. A carbonating apparatus as defined in claim 5 wherein said switch includes resilient magnetic contacts on the exterior of said housing normally spaced apart in circuit-opening relation, a magnet, a helically twisted rod rotatable in said chamber and supporting said magnet within the chamber to move said contacts into circuit-closing relation upon rotation of said magnet, and said float coacts with said rod to rotate said rod and magnet.

7. A carbonating apparatus as defined in claim 3 wherein the last-named means includes a solenoid for actuating said valves, a switch for controlling energization and deenergization of said solenoid upon closing and opening of the switch, and means including a float responsive to the liquid level in said mixing-dispensing chamber for controlling opening and closing said switch and wherein said switch includes resilient magnetic contacts on the exterior of said housing normally spaced apart in circuit-opening relation, a magnet, a helically twisted rod rotatable in said chamber and supporting said magnet within the chamber to move said contacts into circuit-closing relation upon rotation of said magnet, and said float coacts with said rod to rotate said rod and magnet and wherein said rod has a plurality of differently twisted portions spaced along its length to rotate said magnet to coact with said contacts for movement thereof into circuit opening position when the liquid level is above and below a predetermined high and a predetermined low level, respectively, and for movement of said contact into circuit closing position when the liquid is at a level intermediate said high and low levels.

8. A carbonating apparatus as defined in claim 3 wherein the last-named means includes a solenoid for actuating said valves, a switch for controlling energization and deenergization of said solenoid upon closing and opening of the switch, and means including a float responsive to the liquid level in said mixing-dispensing chamber for controlling opening and closing said switch and with the addition of manually actuated means exterior of said housing for closing said switch.

9. A carbonating apparatus as defined in claim 3 wherein the last-named means includes a solenoid for actuating said valves, a switch for controlling energization and deenergization of said solenoid upon closing and opening of the switch, and means including a float responsive to the liquid level in said mixing-dispensing chamber for controlling opening and closing said switch and wherein said switch includes resilient magnetic contacts on the exterior of said housing normally spaced apart in a circuit-opening relation and with the addition of a magnet, a helically twisted rod rotatable in said chamber and supporting said magnet within the chamber to move said contacts into circuit-closing relation upon rotation of said magnet, said float coacting with said rod to rotate said rod and magnet, and with the further addition of a magnet and means mounting it on said housing for movement toward and from said contacts and for rotation to actuate said contacts into circuit closing position upon movement of the magnet toward said contacts.

10. A carbonating apparatus as defined in claim 1, wherein the first-named means includes a vent pipe leading from said reservoir-carbonating chamber for venting gas from the chamber and extending through said inlet duct to be contacted by the liquid flowing through said duct, whereby the heat from said liquid will prevent the accumulation of frost in said vent pipe as the carbonating gas is vented therethrough.

11. A carbonating apparatus as defined in claim 1, wherein said inlet passage of the mixing-dispensing chamber has a spray head above the level in the chamber for spraying the liquid through the gas in said chamber.

12. A carbonating apparatus as defined in claim 1 wherein the first-named means includes a gas inlet pipe and a carbonating head thereon comprising at least one perforated coiled tube adjacent the bottom of the reservoir-carbonating chamber having its opposite ends communicating with said gas inlet pipe.

References Cited

UNITED STATES PATENTS

| | | | |
|---|---|---|---|
| 2,314,984 | 3/1943 | Hudson. | |
| 2,782,016 | 2/1957 | Iannelli | 261—124 X |
| 2,809,597 | 10/1957 | Fowler | 261—35 X |
| 3,052,377 | 9/1962 | Bill | 261—124 X |

HARRY B. THORNTON, *Primary Examiner.*

T. R. MILES, *Assistant Examiner.*